(12) United States Patent
Guerrero et al.

(10) Patent No.: US 7,225,643 B1
(45) Date of Patent: Jun. 5, 2007

(54) RECIRCULATION BUBBLER FOR GLASS MELTER APPARATUS

(75) Inventors: Hector Guerrero, Evans, GA (US); Dennis Bickford, Folly Beach, SC (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 680 days.

(21) Appl. No.: 10/377,651

(22) Filed: Mar. 4, 2003

(51) Int. Cl.
   *C03B 5/193* (2006.01)
   *C03B 5/04* (2006.01)
(52) U.S. Cl. .................. 65/178; 65/134.5; 65/134.8
(58) Field of Classification Search ............. 65/134.5, 65/134.8, 346, 178; 261/121.1, 122.1, 124, 261/126
See application file for complete search history.

(56) References Cited

U.S. PATENT DOCUMENTS 3,219,427 A * 11/1965 Hymowitz .............. 65/134.5
4,407,152 A * 10/1983 Guth ..................... 73/1.03
5,868,814 A * 2/1999 Lin ....................... 65/178
6,464,211 B1 * 10/2002 Downs ................ 261/122.1
2005/0167075 A1 * 8/2005 Eckert ................... 164/134

FOREIGN PATENT DOCUMENTS

JP          56149332 A   * 11/1981

* cited by examiner

Primary Examiner—Steven P. Griffin
Assistant Examiner—Carlos Lopez
(74) Attorney, Agent, or Firm—Esther L. Roberts; Julia C. Moody; Paul A. Gottlieb

(57) ABSTRACT

A gas bubbler device provides enhanced recirculation of molten glass within a glass melter apparatus. The bubbler device includes a tube member disposed within a pool of molten glass contained in the melter. The tube member includes a lower opening through which the molten glass enters and upper slots disposed close to (above or below) the upper surface of the pool of molten glass and from which the glass exits. A gas (air) line is disposed within the tube member and extends longitudinally thereof. A gas bubble distribution device, which is located adjacent to the lower end of the tube member and is connected to the lower end of the gas line, releases gas through openings therein so as to produce gas bubbles of a desired size in the molten glass and in a distributed pattern across the tube member.

10 Claims, 3 Drawing Sheets

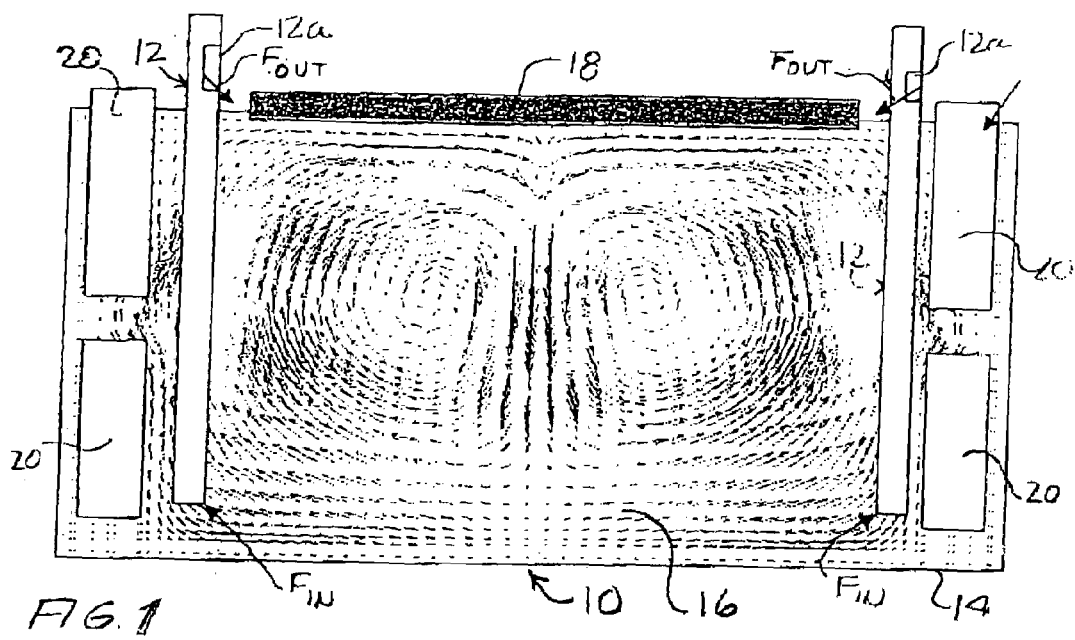
FIG. 1
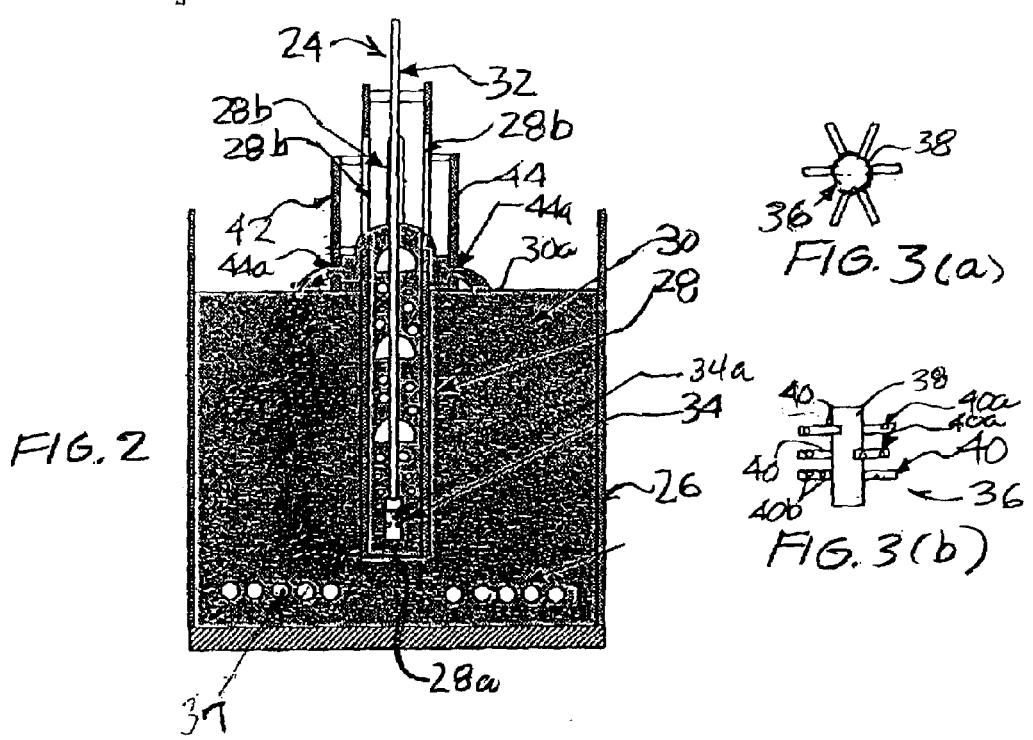
FIG. 2
FIG. 3(a)
FIG. 3(b)

RECIRCULATION BUBBLER FOR GLASS MELTER APPARATUS

The United States Government has rights in this invention pursuant to a contract between the United States Department of Energy and Westinghouse Savannah River Company.

BACKGROUND

1. Field of the Invention

The invention relates to molten glass recirculating apparatus and systems and, more particularly, to a bubbler apparatus for a glass melter that provides enhanced glass recirculation.

2. Description of the Related Art

Air bubblers have previously been used in glass melters. In general, these bubblers comprise air tubes for injecting air bubbles into the free glass pools. A disadvantage of such air bubbles is that liquid flow velocities imparted by the bubbles are lost in the localized liquid recirculation. The need to provide recirculation and agitation of molten glass is well documented and a number of issued patents relate to this problem. Considering some of these patents, U.S. Pat. No. 6,334,337 to Macedo et al. relates to an air bubbler for increasing the glass production of a glass melt, wherein a plurality of bubblers are provided and a precious metal insert is used to protect each of the bubblers from corrosion at the orifice or orifices thereof through which air is injected into the melt.

U.S. Pat. No. 5,868,814 to Lin also relates to apparatus for recirculating molten glass. A gas emitter pipe releases air into a riser chamber having a lower inlet, opening and an upper, outlet opening so that molten glass within the riser chamber rises and exits through the upper opening and along a trough. The exiting molten glass causes additional molten glass to be drawn into the riser chamber through the lower inlet opening.

Other patents disclosing glass melters including gas (air) bubblers include U.S. Pat. No. 6,085,551 to Piper et al. U.S. Pat. No. 4,718,931 to Boettner, and U.S. Pat. No. 4,600,425 to Krumwiede et al.

SUMMARY OF THE INVENTION

Generally speaking, the glass recirculation bubbler of the invention overcomes a common disadvantage of prior art bubblers by constraining the induced liquid flow so as to take place in the upward direction, and, quite importantly, does this with minimal energy loss. As will appear from the discussion below, an important feature of the invention concerns the provision of a gas bubble distribution device as part of the bubbler so as to ensure that bubbles of the desired size are produced and are efficiently distributed within the constrained flow.

In accordance with a first aspect of the invention, there is provided a gas bubbler device for providing recirculation of molten glass within a glass melter apparatus, the bubbler device comprising:

a tube member, having an upper end and a lower end, adapted to be disposed within a pool or bath of molten glass having an upper surface, the tube member including at least one lower opening through which, in use, the molten glass enters into the tube member and at least one upper opening disposed, in use, close to the upper surface of the pool of molten glass and from which, in use, the molten glass exits;

a gas line disposed within the tube member and extending longitudinally thereof, said gas line having a lower end through which gas is released; and a gas bubble distribution device, located adjacent to the lower end of the tube member and connected to the lower end of said gas line, for, in use, releasing gas from the gas line into the tube member to produce gas bubbles in the molten glass within the tube member in a distributed pattern across the tube member.

In a preferred embodiment, the gas line comprises an inwardly projecting, longitudinally extending rib element affixed to an inner wall portion of the tube member and defining a longitudinally extending gas passage. The gas bubble distribution device preferably comprises gas ring member affixed to the lower end of the tube member, the gas ring member including a gas chamber connected to the gas passage and a plurality of gas release openings connected to the annular gas chamber through which, in use, gas is released into the molten glass. The gas release openings preferably comprise inwardly and upwardly directed gas release passages. Advantageously, the gas release passages open at an inner filleted portion of the gas ring member and the passages are equally spaced around the inner filleted portion.

In a further, alternative embodiment, the bubble distribution device comprises a sparger including a central gas chamber and a plurality of radially extending, perforate elements. Preferably, the perforate elements comprise a plurality of vertically spaced tubes disposed in different horizontal planes and radially spaced from each other at equal angles.

In accordance with a further, related aspect of the invention, there is provided a glass melter apparatus, the apparatus comprising:

a melting tank for containing a pool of molten glass having an upper surface defining a melt line, and gas or electrical means for heating the molten glass in the tank; and a plurality of air bubblers, supported by said tank so as to be suspended into the molten glass, for providing recirculation of the molten glass within the tank, each of said air bubblers comprising a vertically extending tubular housing having at least one lower inlet into which molten glass flows and at least one upper outlet from which molten glass flows after passage thereof up the housing, an air line connected to an air supply source and terminating in a lower end, and a gas bubble distribution device, disposed adjacent to said at least one inlet, connected to the lower end of said air line and including a plurality of openings therein, for releasing air from said air line through said plurality of openings into the molten glass flowing into the at least one inlet of said tubular housing.

At least one upper opening preferably comprises a plurality of longitudinally extending, circumferentially spaced slots. In one important implementation, the slots are disposed, in use, above and adjacent to or below the upper surface of the pool of molten glass.

Preferably, at least one lower opening comprises a central opening at the bottom of the tube member.

Preferably, the air bubblers include one or more of the various features described above.

Further features and advantages of the present invention will be set forth in, or apparent from, the detailed description of preferred embodiments thereof which follows.

BRIEF DESCRIPTION OF THE DRAWINGS

FIG. 1 is a cross sectional view of a glass melter incorporating a plurality of bubblers in accordance with the invention;

FIG. 2 is a schematic representation of a simplified bubbler in accordance with a first preferred embodiment of the invention;

FIGS. 3(a) and 3(b) are a bottom plan view and side elevational view, respectively, of alternative embodiment of the sparger of FIG. 2;

DETAILED DESCRIPTION

Figure 4:
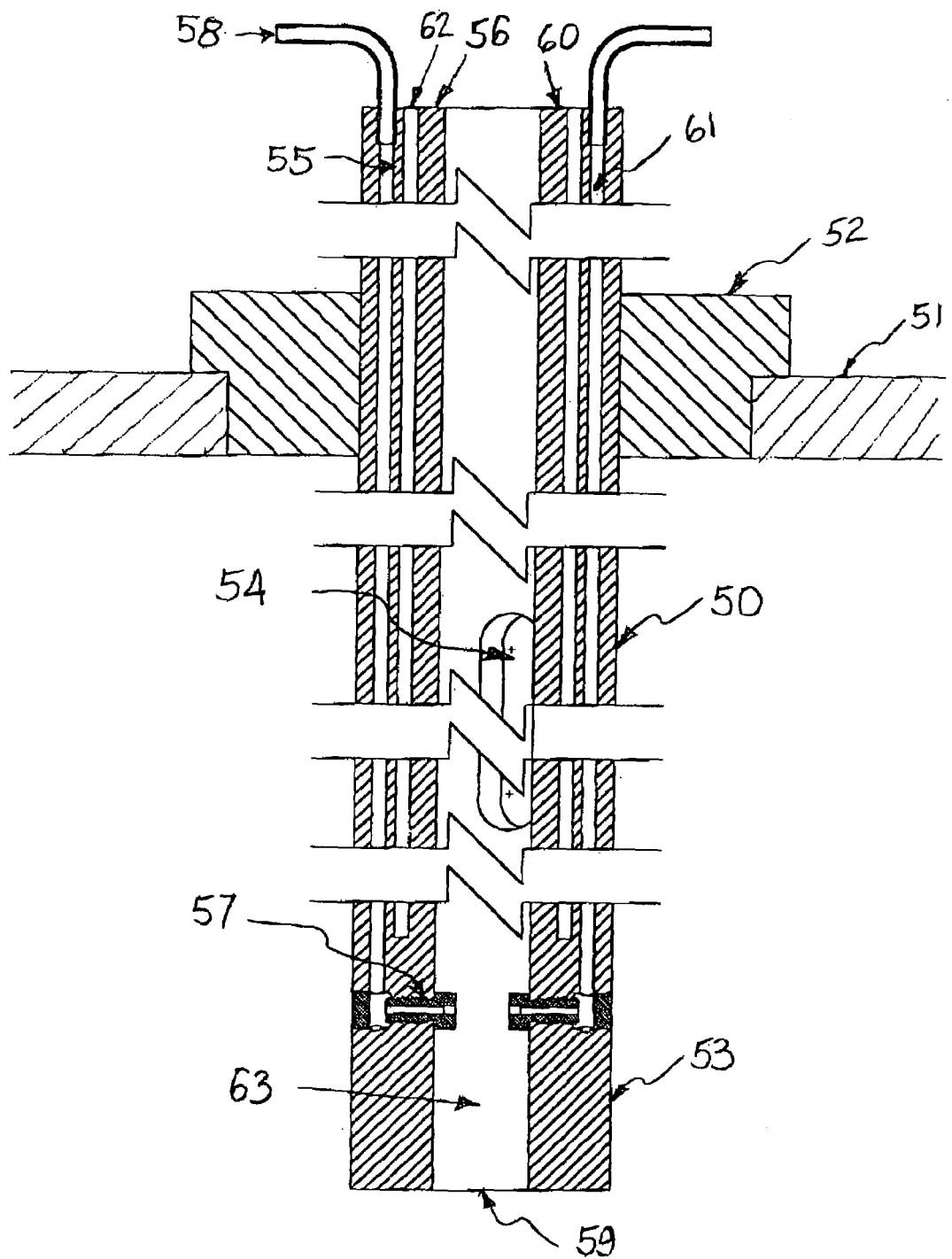
FIG. 4 is a cross sectional view of a further preferred embodiment of the invention.

Referring to FIG. 1, there is shown a glass melter 10 incorporating a pair of gas bubblers 12 constructed in accordance with the invention. The melter or melting apparatus 10 includes a tank or container 14 in which a bath or pool 16 of molten glass is contained. A cold cap is indicated at 18 while electrodes are indicated at 20. It will be understood that melter 10 is conventional apart from bubblers 12, and that a bubbler, or bubblers, in accordance with the invention can be incorporated in other, different melters.

As illustrated by arrows $F_{in}$ and $F_{out}$, the molten glass in bath 16 flows into the bottom of the bubblers 12 and flows out of the bubblers 12 through openings therein located above the upper surface of the molten glass, and, in FIG. 1, through openings 12a near the top of the bubblers 12, so as to create the flow pattern shown. This flow pattern is discussed in more detail below.

Referring to FIG. 2, a schematic showing is provided of a simplified bubbler, denoted 24, disposed in a container 26. FIG. 2 will be used to explain the principles of operation of the bubbler of the invention, with container 26 being representative of a conventional melt tank corresponding, e.g., to tank 14 of FIG. 1.

Bubbler 24 includes a tube or pipe member 28 disposed and supported within a viscous liquid 30 corresponding to the molten glass pool or bath 16 of FIG. 1 and having an opening 28a at the lower end thereof. Although a simple opening at the bottom of pipe 28 is illustrated, the lower end of pipe 28 may be closed, and the pipe 28 provided with vertical slots (not shown) disposed around the circumference thereof. However, because such vertical slots take up valuable depth in the submergence of the bubbler tube 28, a simple open bottom end is generally preferable for most applications.

Upper slots 28b are provided in tube or pipe 28 at a portion thereof, located at the upper end thereof, which, in this embodiment, is disposed above the upper surface 30a of the viscous liquid 30.

Although slots or openings 28b are shown as being located above the surface 30a of the viscous liquid of pool 30, the slots 28b can also be located below this surface 30a. In general, slot 28b should be located near (above or below) surface 30a in order to provide the desired liquid circulation. An air line 32 is disposed centrally of tube or pipe 28 and is connected at the upper end to an air supply unit (not shown) and the lower end to a sparger 34. Sparger 34 comprises a cylinder or tube closed at one end and having a plurality of holes 34a therein along the length thereof through which air is released so that the resultant bubbles created thereby bubble upwardly in pipe 28. In an exemplary non-limiting embodiment, four 0.030 inch diameter holes 34a are provided. It is noted that although sparger 34 is superior to a simple pipe opening at the bottom of pipe 28, a sparger of the configuration illustrated in FIG. 2 is less than completely satisfactory because the bubbles are not effectively distributed across the pipe or tube 28. In a more preferred embodiment shown in FIGS. 3(a) and 3(b), the sparger, which is denoted 36 in these figures, comprises a central cylindrical element or tube 38 in fluid communication with the free end of air inlet pipe 32 and having a plurality of porous or drilled tubes 40 horizontally extending outwardly therefrom at different angles and in different horizontal planes, as illustrated. In a specific non-limiting example, wherein vertical outer tube 28 of FIG. 2 is typically of a 3-inch diameter, and inner air line 32 is typically of ½-inch diameter, three ¼-inch tubes 40 are provided which are separated from one another vertically by a 1-inch spacing and are spaced apart radially by 120°. The ends of tubes 40 are capped, as is the end of element 38, and in the exemplary embodiment referred to above, eight to twelve 0.080-inch diameter holes 40a are drilled into the side of tubes 40 at various radial distances so as to uniformly disperse the air bubbles over the cross-section at pipe 28. Again, it will be appreciated that this specific embodiment, while beneficial, is merely exemplary and, in general, any arrangement of tubes and holes or pores in the tubes can be employed which produces bubbles of the desired size and which results in distribution of the air bubbles substantially across the width of the tube.

Air bubbles injected from the sparger 34 or sparger 36 rise up inside of outer tube or pipe 28, thereby forming a two-phase mixture with the viscous liquid (molten glass). The air bubble-liquid mixture has a lower density than the liquid outside of outer tube 28 and thus the mixture rises. The outer liquid enters through the bottom opening 28a in response to the upward flow of the mixture inside of tube 28. The two-phase mixture is lifted above the upper surface of the liquid pool 30, and, as illustrated, flows or pours out of upper openings 28b, with some of the air bubbles separating from the liquid inside the bubbler.

It will be understood that height of the lifted air-liquid mixture, or void fraction, of the bubbler 24, depends on the total air flow and the friction pressure drop inside of the bubbler 24. Accordingly, there is an optimum diameter for the outer tube 28 in producing maximum flow. For a given diameter of tube 28, there is also a maximum liquid flow because as the air flow exceeds the value for the "slug flow" regime, the air flow enters the "churn flow" and "annular flow" regimes wherein the most of the air flow energy is expended in overcoming interfacial flow resistance.

It will be appreciated from the foregoing that bubbler 24 is essentially an air-operated liquid pump for pumping liquid glass at the glass pool elevation to upper glass pool layers. The embodiment illustrated in FIG. 2 also includes a device 42 for measuring the pumped liquid. Device 42 includes a container 44, formed, e.g., by an outer tube or pipe with a bottom plate or otherwise closed bottom, installed around the outer tube openings 28b so that the pumped liquid exiting from the openings 28b is contained. As indicated above, the air in the two-phase mixture escapes in the upper region of tube 28 so that a liquid-only medium forms in the container 44. Holes 44a are located near the bottom of the side walls of container 44, and/or in the bottom thereof. In a specific non-limiting example, such holes are arranged in a vertical row and four 12-inch drain holes are provided at or near the bottom of container 44. In all embodiments, at steady state, a constant head of liquid (molten glass) builds up inside of container and the height of the liquid in container 44 is a measure of flow rate, as determined by calibration using the standard weight-time method. In an alternative embodiment, container 44 includes holes (not shown) of a ³⁄₁₆-inch diameter and every half inch to permit the liquid to escape back into pool or bath 30. Such a device can be used to measure viscosity and to determine efficient pumping parameters for specific applications.

Referring again to FIG. 1, the bubblers indicated at 12, and constructed generally as illustrated in FIGS. 2 and 3(*a*) and 3(*b*), provide increased circulation in melter 10 as follows. In an electrically heated melt, the glass flow is upwardly along the peripheral regions near the wall electrodes 20 due to heating. As shown, the flow is then horizontal towards the center in the upper pool layers below the solid glass frit region or "cold cap" 18, and then downwardly in the central inner region of the molten glass pool 16. The flow then moves to the outer regions, thereby completing the natural rolling circulatory flow. Thus, as illustrated, there are two "rolls" symmetrically located in the outer regions adjacent to the opposite electrodes 20. By installing bubblers 12 singly, or in multiples, in the outer regions adjacent to the electrodes 20, the glass circulation, which is limited by the high viscosity of the melted glass, can be increased by the pumping action of the bubblers 12. However, although this positioning is preferred, the invention is not limited to such positioning of the bubblers 12. In general, bubblers 12 should not be placed at a location where glass flow is downward, which the pumping action of bubblers 12 would resist rather than aid the main glass flow.

Figure 5:
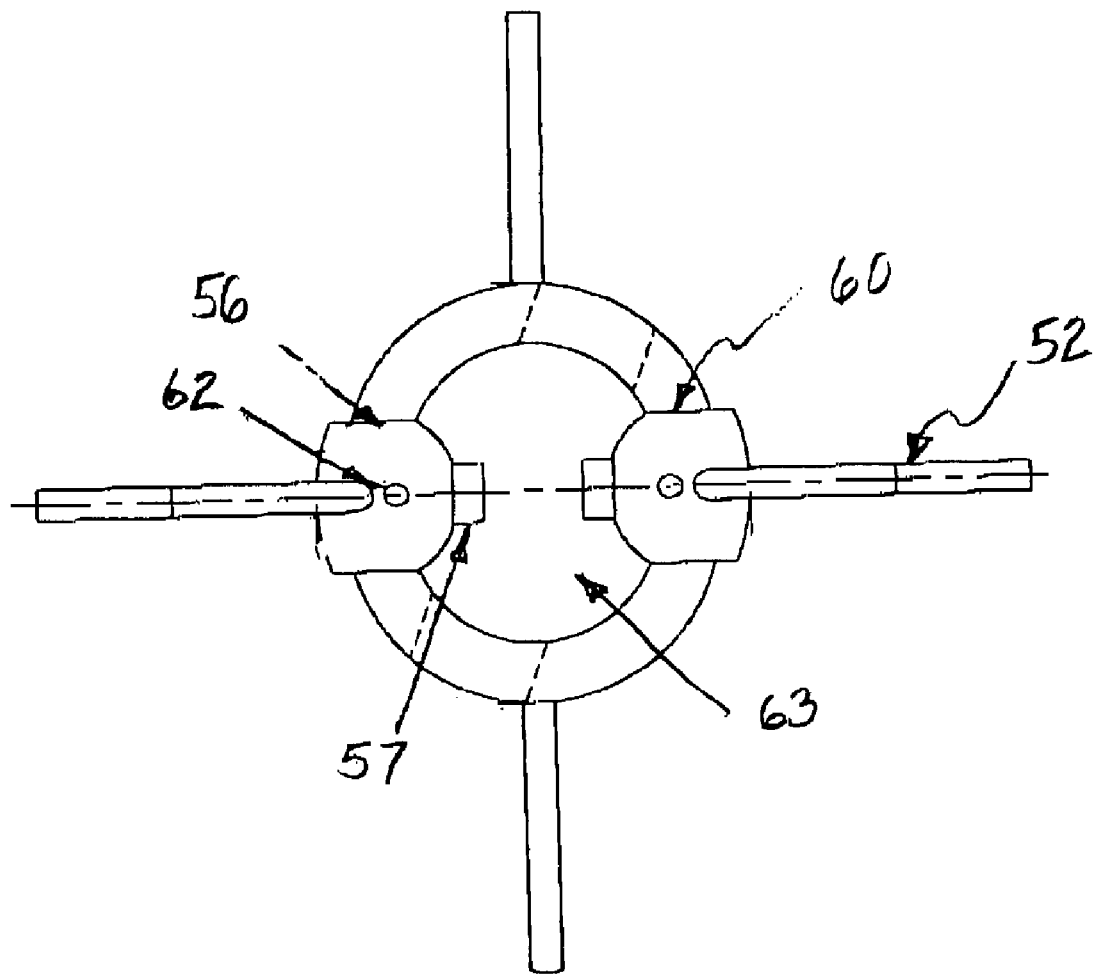
FIG. 5 is a cross sectional view of the top of the further preferred embodiment of the invention.

Referring to FIG. 4 (side view) and FIG. 5 (top view) a practical embodiment of the invention is shown. Although a bubbler constructed in accordance with principles discussed above in connection with FIGS. 2, 3(*a*) and 3(*b*) is useful in many applications, in other applications such as melters containing highly radioactive waste, a construction which is optimized for long operating life and which resists corrosion/erosion damage is preferred. Referring first to FIG. 4, the bubbler, which is generally denoted 50, is supported from the melter top cover 51 via strut supportss 52 or any similar supports.

Bubbler 50 comprises a tube housing 53, which includes outlet slots 54. In the illustrated embodiment, outlet slots 54 are located above the melt line of a viscous liquid (not shown) in melter 50. In this embodiment, the central air tube 32 and the associated sparger 34 of FIG. 2 or associated sparger 36 of FIGS. 3(*a*) and 3(*b*) are eliminated, and replaced by an air line 55 which is built into or otherwise affixed to a thickened wall portion or rib 56 of tube housing 53 and terminates in an air nozzle 57. A short air supply tube, adapted to be connected to an air supply unit (not shown) is indicated at 58. Also eliminated are the lower slots mentioned above in connection with an alternative embodiment of FIG. 2 (but not shown in FIG. 2) so that glass enters directly through the open bottom end 59 of tube housing 53. As indicated previously, elimination of the lower slots increases insertion depth and pumping capacity.

A second rib 60, defining a long vertical hole 61, is located on the opposite side of tube housing 53 from air line 55. Thermocouple hole 62 is employed to provide a site for thermocouples used in indicating bubbler performance and is an optional feature of this embodiment.

Referring particularly to FIGS. 4 and 5, a plurality of air nozzles or air release openings 57 are provided which are pointed inwardly to the central opening 63. Two air nozzles 57 are illustrated in the exemplary embodiment of FIGS. 4 and 5, but a different number can, of course, be used.

The basic operation of the bubbler device of FIGS. 4 and 5 is essentially the same as described above for the embodiments of FIGS. 2 and 3(*a*), 3(*b*), with the air nozzles 57 producing air bubbles of the desired size and distribution, and that description will not be repeated here. As indicated previously, the embodiment of FIGS. 4 and 5 is of a more robust construction which is particularly suitable for applications wherein, for example, long life is important.

Although the invention has been described above in relation to preferred embodiments thereof, it will be understood by those skilled in the art that variations and modifications can be effected in these preferred embodiments without departing from the scope and spirit of the invention.

We claim:

1. A gas bubbler device for providing recirculation of molten glass within a glass melter apparatus, said bubbler device comprising:
   a) a tube member, having an upper end and a lower end adapted to be disposed within a pool of molten glass having an upper surface, said tube member including at least one lower opening through which said molten glass enters into said tube member and at least one upper opening disposed, in use, close to the upper surface of said pool of molten glass and from which said molten glass exits;
   b) a gas line disposed within said tube member and extending longitudinally thereof, said gas line comprising a longitudinally extending rib element affixed to a wall portion of said tube member and a lower end through which gas is released;
   c) a gas bubble distribution device, located adjacent to the lower end of said tube member and connected to the lower end of said gas line to release gas from said gas line into said tube member to produce gas bubbles in the molten glass within said tube member in a distributed pattern across said tube member.

2. A device according to claim 1, wherein said bubble distribution device comprises gas ring member affixed to the lower end of the tube member, said gas ring member including a gas chamber connected to said gas line and a plurality of gas release openings connected to the gas chamber through which gas is released into the molten glass.

3. A device according to claim 2, wherein said gas release openings comprise inwardly and upwardly directed gas release passages.

4. A device according to claim 3, wherein said gas release passages open at an inner filleted portion of the gas ring member.

5. A device according to claim 4, wherein said gas release passages are about equally spaced around said inner filleted portion.

6. A device according to claim 1 wherein said at least one upper opening comprises a plurality of longitudinally extending, circumferentially spaced slots.

7. A device according to claim 6 wherein said slots are disposed above and adjacent to the upper surface of the pool of molten glass.

8. A device according to claim 6 wherein said slots are disposed below and adjacent to the upper surface of the pool of molten glass.

9. A device according to claim 1 wherein said gas bubble distribution device comprises a central gas chamber and a plurality of radially extending, perforate elements.

10. A device according to claim 9 wherein said perforate elements comprise a plurality of vertically spaced tubes disposed in different horizontal planes and radially spaced from each other at equal angles.

\* \* \* \* \*